June 10, 1969

G. H. ROBINSON ET AL 3,449,658

METHOD AND APPARATUS FOR SENSITOMETRICALLY TESTING
PHOTOCONDUCTIVE INSULATORS

Filed Nov. 17, 1966

GENE H. ROBINSON
JAMES G. JARVIS
INVENTORS

BY Lloyd F. Seebach

AGENT

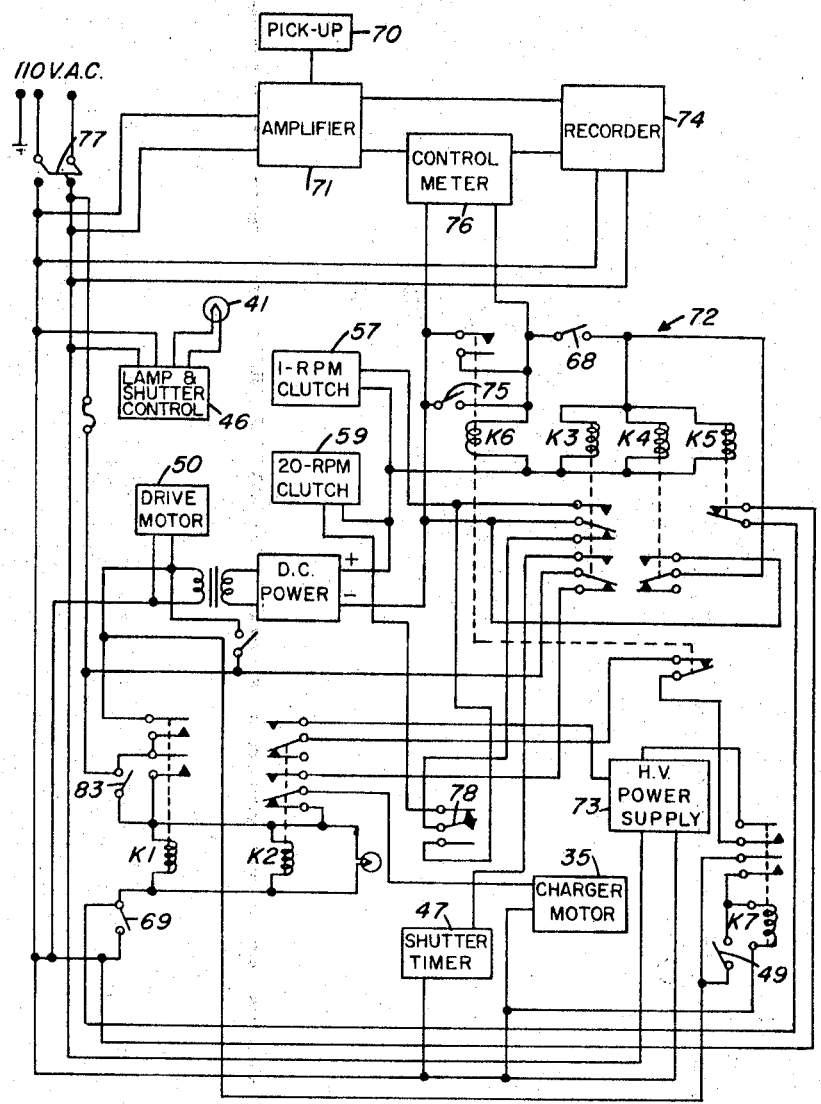

3,449,658
METHOD AND APPARATUS FOR SENSITO-
METRICALLY TESTING PHOTOCONDUCTIVE
INSULATORS
Gene H. Robinson and James G. Jarvis, Rochester, N.Y.,
assignors to Eastman Kodak Company, Rochester, N.Y.,
a corporation of New Jersey
Filed Nov. 17, 1966, Ser. No. 595,226
Int. Cl. G01r 5/28
U.S. Cl. 324—32                                     11 Claims The present invention relates to a method and apparatus for providing sensitometric information concerning photoconductive insulators such as are used in electrophotography.

Static methods for testing electrophotographic papers are known. Such methods consist in their simplest form of a holder for the sample, a device for charging the sample and an electrometer by which the surface charge can be measured. The surface charge on the paper during charging, the decay of charge in the dark and the decay of charge when the sample is exposed to light can be examined sequentially. However, such static testing processes and apparatus have many drawbacks in that (1) a sample is not always uniformly charged over its entire area, (2) samples of the same thickness and the same dielectric constant cannot always be charged to the same initial potential, (3) a minimum and constant delay time between the exposing and the potential measuring stations cannot always be maintained, (4) an output curve that can be used directly without its being replotted is not available, and (5) such static testing methods and apparatus are not completely automatic so as to provide rapid analysis of a sample or a group of samples.

Among the common photosensitive materials, for example, silver halides, the diazonium compounds, the photopolymers and the photoconductive insulators (xerographic layers), only the latter lend themselves to a nondestructive sensitometric evaluation. This characteristic of photoconductive insulators provides three important advantages: (1) The sensitometric properties of a photoconductive insulator can be determined independently of, but correlatable with, a development operation. This means that an intrinsic property of the photosensitive material itself can be measured rather than one which is jointly dependent on material, developer and development method. (2) The same sample can be tested many times to provide information on aging and the influence of various ambients. Further, by testing the same area each time, evaluation can be made independently of sample uniformity. (3) It is possible on a production basis to carry out, nondestructively, a photoevaluation of every square inch of material that is being produced.

It is an object of the invention to provide a method and apparatus by which the surface charge remaining on an exposed photoconductive insulating material can be accurately measured and recorded as a function of the exposure.

Still another object of the invention is to provide a method and apparatus by which the sensitometric properties of a photoconductive insulating material can be measured and determined independently of, but correlatable with, a development operation.

And yet another object of the invention is to provide a method and apparatus by which the same photoconductive insulating material can be tested many times to provide information relative to aging as well as the influence of various ambients.

These and other objects and advantages of the invention will be apparent to those skilled in the art by the detailed description of a preferred embodimnet of the method and apparatus which follows.

The above objects and advantages are accomplished according to the present invention by a sensitometric testing device which provides a plot or graph of the potential of the surface charge remaining on a photoconductive insulating material that has been uniformly charged and then exposed, as a function of the exposure. The plot is one of V (voltage) vs. log E (exposure). Since V can be correlated with optical density the curve can be designated as an "electrical H and D curve." The process comprises (1) charging a strip of photoconductive insulating material to a predetermined level of surface potential; (2) exposing the charged strip through an absorptive wedge having a continuously varying density throughout its length; and (3) plotting the "electrical H and D curve" (voltage vs. log E).

Apparatus for carrying out the present invention can be described as a rotary sensitometer since the apparatus preferably comprises two contra-rotating drums which are conviently referred to as an exposure drum and a sample drum. Half of the peripheral surface of the exposure drum is covered by a carbon-absorptive wedge of varying density. The other half of the peripheral surface of the exposure drum is open so that light can enter the drum and emerge from the drum after passing through the wedge and an aperture in a stationary internal mask which defines the exposure area. A test sample is held in position on the peripheral surface of the sample drum which is spaced from the exposure drum and interconnected therewith so that the two drums are rotated in synchronism. A pickup head which is part of a field meter is arranged adjacent the sample drum for measuring the potential of the surface charge accumulated on the photoconductive insulating material as well as the potential of the charge remaining on the photoconductive insulating material after exposure. A moving wire corona charger is also located adjacent the sample drum and diametrically opposite the field meter. The corona charger uniformly charges the photoconductive insulating material in accordance with the polarity of the corona wire. A lamp housing is located adjacent the exposure drum and diametrically opposite the sample drum, the housing enclosing a light source and a movable shutter. The apparatus also includes a control panel which programs the operation of the sensitometer.

With the shutter blocking the light source and the corona source energized, the drums are rotated in synchronism at a speed such that the surface charge or potential of the test sample is increased in small increments with each passage of the test sample relative to the corona charger. When the surface charge of the test sample reaches a predetermined value, as measured by a meter on the control panel, the corona source is de-energized, the speed of the drums is changed to a predetermined "exposure" speed and the lamphouse shutter is opened. The test sample is then exposed to the light source through the absorptive wedge which is moved in synchronism with the test sample. A timer closes the shutter immediately after the exposure of the last portion of the sample. As the exposed sample is moved past the pickup head, the potential of the surface charge remaining on the sample throughout its length is measured and a V vs. log E curve is automatically traced out on graph paper in a well known manner by means of a recorder.

Reference is now made to the accompanying drawings wherein like reference numerals designate like parts and wherein:

FIG. 3 shows a trace derived from a recorder to provide a voltage vs. log exposure curve as a function of the exposure; and FIG. 4 is a schematic wiring diagram for the sensitometer shown in FIGS. 1 and 2.

Figure 1:
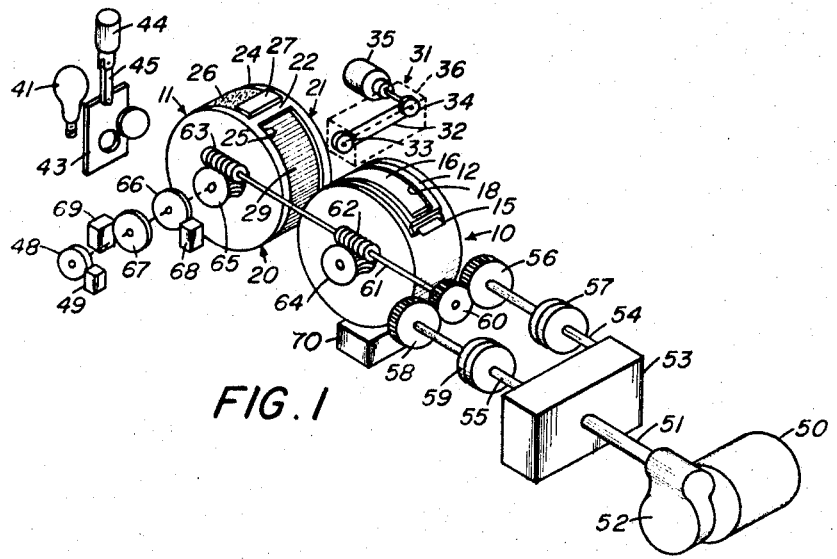
FIG. 1 is a schematic perspective view of a preferred embodiment of a rotary sensitometer.

With reference to the drawings, a sample drum 10 and an exposure drum 11 are mounted in spaced relation for rotation about respective spaced and parallel horizontal axes. The sample drum 10 is hollow and carries on its peripheral surface a rectangular frame 12 which has one end fixed to the drum at 13 by means of suitable screws or rivets 14, while the other end is held on the drum by a spring latch designated generally by 15. The latch 15 when released allows the test sample 16 to be positioned on drum 10 and held thereon by frame 12 when the latter is secured by latch 15. The drum 10 therefore serves as a support member for the test sample 16. At the fixed end 13 of the frame 12, a narrow strip 17 of an insulating material, such as "Mylar," is secured and functions as an electrostatic fiducial mark, the purpose of which will be evident from the description which follows. The frame 12 has an opening 18 that is about 9 x 1¾", which is the actual test area of the sample 16.

The exposure drum 11 has the same dimensions as the sample drum 10, that is, the drums are of the same length and diameter. The exposure drum 11 is formed by two circular end plates 20 and 21 which are joined by diametrically opposite axial struts 22 and 23, thereby providing the peripheral surface of the drum with two openings 24 and 25. A cast carbon continuous wedge 26 having, for example, a density range from 0.02 to 4.0 over a 9-inch length is mounted on drum 11 and over opening 25 by means of a thin apertured retaining frame or member 27 or any other suitable means. The opening 24 is unobstructed so that light can enter the exposure drum 11 and emerge therefrom after passing through an opening 28 in a stationary internal mask 29 and the wedge 26. The drum 11 therefore serves as a support member for the wedge 26.

A corona charging source 31 is mounted above the sample drum 10 and is preferably of the type which comprises an endless wire 32 that encircles a pair of spaced pulleys 33, 34 with one of the latter being connected to and driven by a motor 35. The wire 32 is enclosed within an insulating housing 36 having an open bottom facing the drum 10. A moving wire corona charger is preferable, since it provides uniform charging regardless of the polarity of the corona wire. For best results, the corona wire 32 can be maintained at a potential of approximately 9 kv. for all tests.

Figure 2:
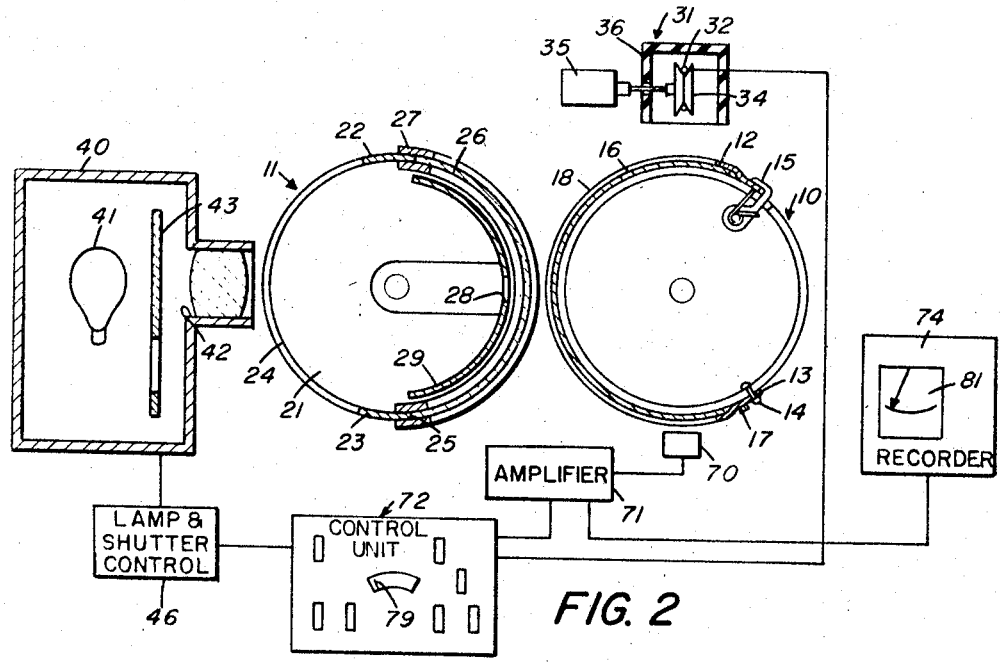
FIG. 2 is a partial vertical section showing the arrangement of the various elements associated with the drums and lamphouse as well as the control panel for programming the sensitometer.

A lamphouse 40 is located adjacent exposure drum 11 on the side opposite that adjacent the sample drum 10, see FIG. 2. A light source 41 is mounted within lamphouse 40. An apertured shutter 43 is actuatable into a nonobstructing position relative to aperture 42 in lamphouse 40 by means of a solenoid 44 and a link 45. The light source 41 is preferably a sensitometer-lamp which is capable of being maintained at about 3000° K. The light source 41 is energized by a transformer wired in series with a variable autotransformer and the current flow through the light source is monitored by an ammeter, the aforementioned electrical elements comprising a lamp and shutter control, as designated by numeral 46 in FIG. 4. The movement of shutter 43 is controlled by the solenoid 44 which is activated by a suitable timer 47, such as a Microflex Timer manufactured by Eagle Signal Company of Moline, Ill.

The drive means for rotating the drums 10 and 11 in synchronism comprises a motor 50 which when energized drives an output shaft 51 through a gear reduction unit 52 that is a part of the motor. The shaft 51, in turn, drives another gear reduction unit 53 having a pair of output shafts 54, 55. Shaft 54 drives a gear 56 through an electromagnetic clutch 57. Likewise, the shaft 55 drives a gear 58 through an electromagnetic clutch 59.

The gears 56 and 58 engage an idler gear 60 on a shaft 61. Rotatable with and by the shaft 61 are a pair of spaced worms 62 and 63 which are of opposite hand and mesh with respective worm wheels 64, 65 mounted on drums 10 and 11, respectively, whereby the drums 10 and 11 are rotated in synchronism and in opposite directions. The output shafts 54 and 55 provide two speeds for driving the drums 10 and 11, one driving at 20 r.p.m. and the other at 1 r.p.m. The speed at which the drums are rotated is dependent on which of the clutches 57 or 59 is energized.

Adjacent the sample drum 10 and diametrically opposite the corona charger 31, a field meter pickup head 70 is arranged and electrically connected to an amplifier 71. The field meter, comprising head 70, amplifier 71 and a recorder 74, is used to measure the potential of the charge on the surface of dielectric layers as described in "Measurements of Electrical Polarization in Thin Dielectric Materials" by Tyler, Webb and York in the Journal of Applied Physics (26:61–68, No. 1, January 1955).

For providing the various controls, three cams 48, 66 and 67 for operating respective microswitches are mounted on the shaft of exposure drum 11. These are a delay switch 49, delay switch 68 and an end of cycle switch 69 which form a part of the programming circuitry in a control unit 72, see FIG. 4. The control unit 72 programs the operation of the sensitometer and provides outlets for the high voltage supply 73, for the corona charger 31, for the recorder 74, for the amplifier 71 and for the light source 41. A start cycle switch 83 and a manual shift switch 75 are included on the control unit 72. A commercially available control meter or locking milliammeter 76 is provided with a presettable switch (not shown) which is closed when a predetermined potential is obtained and is used as a sequence tripping control. Electrical signals from the sample 16 are amplified in the amplifier 71 and are fed into recorder 74. These signals are converted into mechanical movement of a recording stylus for providing a continuous plot on a moving chart paper of the potential of the surface charge on sample 16. The calibration of the field meter is carried out by applying to the sample drum 10 on the side opposite the frame 12, a piece of insulating material overlaid by a thin conductor to which a known potential is applied. The total thickness of the calibration patch is comparable to the samples which will be tested subsequently. After the field meter has been calibrated, it is checked for linearity and the calibration sample is then removed from the sample drum.

The main A.C. power switch 77 on the control unit 72 is turned on, thereby supplying 110 volts A.C. to the control unit 72, and at the same time to the amplifier 71, the high voltage power supply 73, the recorder 74 and the lamp control 46. The lamp control 46 is adjusted so that the proper current is supplied to lamp 41 to maintain a color temperature of about 3000° K. The presettable switch in control meter 76 is then set for the proper tripping potential which is about 680 volts for a standard test run. This tripping value was found to give a potential of about 600 volts at the time of readout. This voltage difference is due to dark decay of the average sample.

After the apparatus has been properly set up, the frame 12 is released by means of latch 15 and the sample 16 is placed on the drum 10 after which the frame is relatched in position. At this point the sample 16 is partially under the corona charger 31. If the cycle were to begin at this point the trailing edge of the sample 16 would receive more charge than the leading edge. To avoid this, the energization of corona charger 32 is delayed by cam 48 and switch 49 in the circuit of relay K7 until the sample has been moved past the charger. A loading switch 78 is provided which, when held depressed, energizes the 1 r.p.m. clutch 57, thereby rotating the drums 10 and 11 for the purpose of calibration, etc. The start switch 83 is then depressed and the testing sequence begins under the programming of the control unit 72. The start switch 83 causes relays K1 and K2 to be energized which through their respective contacts serve to energize drive motor 50, the 20 r.p.m. clutch 59, the corona wire motor 35 and connects the high voltage output to the corona wire 32 (relay K6). The drums 10 and 11 are then rotated at 20 r.p.m. and the shutter 43 is in front of source 41 so that no exposure takes place while the sample 16 is being rotated continually under the corona charger 31 and relative to the pickup head 70. The control meter 76 shows by means of indicator 79 and the recorder 74 records the increase in potential of the surface charge on the test sample 16 with each revolution of the drum 10. This speed of the drum 10 and the potential applied to the corona wire 32 are such that the potential of surface charge on the test sample 16 increases in small increments of about 30 to 40 volts with each revolution of drum 10. Once the potential of the surface charge on the sample 16 reaches the preset value of 680 volts, as shown by the indicator 79, the presettable switch in control meter 76 is closed, thereby energizing relay K6 which maintains control meter 76 through its one closed contact and cuts out the high voltage supply 73 through its other open contact. Control of the operation is now switched to microswitch 68 which is actuated to a closed position by cam 66 on the shaft of drum 11. Cam 66 can be adjusted to delay closing switch 68 and hence, the speed of the drums, until the leading edge of the sample is very close to the exposure plane, that is, opening 28 in mask 29. At this time, switch 68 is closed, thereby energizing relays K3, K4 and K5. The contacts of relay K3 cause charger motor 35 to be cut out, clutch 59 to be deenergized and clutch 57 to be energized so that the drums 10 and 11 are then driven at 1 r.p.m., and shutter timer 47 to be energized thereby moving the aperture in shutter 43 into alignment with the light source or lamp 41. The contacts of relay K4 maintain relays K3, K4 and K5 energized. The contacts of relay K5 are opened to permit the end of cycle switch 69 to control the cutting out of relays K1 and K2.

The test sample 16 now moving at the rate of 1 r.p.m. is exposed through the continuous wedge 26 which is also being moved at the same rate in an opposed direction and in synchronism with the sample 16. The timer 47 is set so as to close the shutter 43 immediately after the last portion of the sample is exposed. As the exposed sample moves past the kickup head 70, the first signal to be derived is from the insulating strip 17 which also received a charge during the sample charging operation. The width of the strip 17 is small enough with respect to the aperture over the pickup head 70 so that the recorder only deflects 40 volts. This small deflection is used as a fiducial mark 80 (see FIG. 3) for locating the calibration scale of the log exposure curve that will be traced. As the exposed sample 16 moves past the pickup head 70, a curve 82 is traced automatically on the chart paper 81 as seen in FIG. 3. When the sample reaches a position where it is accessible to the operator, the end of cycle switch 69 is actuated by the cam 67 on the shaft of the drum 11 to an open position thereby causing relays K1 and K2 to be deenergized and the test is then completed. The manual shift switch 75 is provided for permitting the operator to discontinue the charging operation, thereby switching the apparatus to the exposure cycle for measuring the potential of surface charge on the test strip. Such an operation may be necessary in the event the test sample is incapable of reaching the preset potential.

A typical organic photoconductor requires about 15 charging passes for a charging time of about 45 seconds. Once the speed of the drum 10 has been changed, only one revolution of the sample drum 10 is required to measure the potential of the surface charge remaining on the sample after exposure and to proceed to the stop position, thereby requiring a total test time of about 105 seconds. The log exposure values are marked on the electrical H and D curve from a calibration plate that locates the exposure values with respect to the deflection or fiducial mark 80. In the event the intensity of the light source 41 should change, the deflection or fiducial mark 80 can be moved relative to the calibration plate so that the same calibration plate can always be used.

In the preferred embodiment of the invention the support member for the test sample 16 and for the absorptive wedge 26 have been disclosed as rotatable members. However, the same results can be obtained by moving the test sample and absorptive wedge in linear paths, for example, by reciprocating the test sample past a corona charger at the charging rate, then moving the sample and absorptive wedge relative to each other at the exposure rate and measuring the potential of the surface charge remaining on the surface of the test sample as the latter is moved past a pick-up head of a field meter. In other words, the apparatus described in detail hereinabove, while a preferred embodiment, is not the only form of apparatus by which the method of the invention can be accomplished.

The embodiments of the invention in which an exclusive property or privilege is claimed are defined as follows:

1. Apparatus for sensitometrically testing a strip of photoconductive insulating material comprising:
   a strip support movable in a prescribed path sequentially at a charging rate and at an exposure rate;
   a corona charging source arranged relative to said path for applying a predetermined surface charge to said strip;
   means arranged relative to said path and spaced from said corona source for exposing said strip after being charged;
   an absorptive wedge having a continuously varying density throughout its length positioned between said strip support and said exposing means and movable relative to said exposing means;
   drive means including first coupling means for moving said support at said charging rate whereby said strip is moved relative to said corona source, and second coupling means for moving said support and said wedge at said exposure rate whereby said strip and said wedge are moved in synchronism relative to said exposing means; and
   control means responsive to the potential of said predetermined surface charge for deenergizing said corona source, for activating said exposing means and for deactivating said first coupling means and activating said second coupling means.

2. Apparatus according to claim 1 including:
   means arranged relative to said path and in a position therealong for continuously measuring the potential of the surface charge on said strip during movement of the latter relative to said corona source and for measuring the potential of the surface charge remaining on said strip after exposure thereof.

3. Apparatus in accordance with claim 2 including:
   means responsive to said measuring means sequentially recording the potential of the surface charge on said strip and the potential of the surface charge remaining on said strip after exposure as a function of the exposure.

4. Apparatus for sensitometrically testing a strip of photoconductive insulating material comprising:
   a first rotatable drum for moving said strip sequentially at a charging rate and at an exposure rate;
   a corona charging source arranged relative to said first drum for applying uniform incremental surface charges to said strip;
   means for exposing said strip after being charged including a light source, a movable light obstructing shutter and a fixed mask arranged in spaced relation to said first drum;

a second rotatable drum positioned between said first drum and said exposing means and provided with a pair of diametrically opposed openings over one of which an absorptive wedge having a continuously varying density throughout its length is mounted for movement is synchronism with said strip relative to said exposing means;

drive means including first coupling means for moving said strip at said charging rate whereby said strip is moved relative to said corona source until said strip has acquired an overall predetermined surface charge and second coupling means for moving said strip and said wedge in synchronism at said exposure rate relative to said exposing means; and control means responsive to said predetermined surface charge for deenergizing said corona source, for energizing said light source and moving said shutter to an unobstructing position and for deactivating said first coupling means and activiating said second coupling means.

5. Apparatus according to claim 4 including:

means arranged relative to said first drum and in a position beyond said exposing means for continuously measuring the increase in the potential of the surface charge on said strip during movement of the latter relative to said corona source and for measuring the potential of the surface charge remaining on said strip after exposure thereof.

6. Apparatus according to claim 5 including:

means responsive to said measuring means for sequentially recording the increases in the potential of the surface charge on said strip and the potential of the surface charge remaining on said strip after exposure as a function of the exposure.

7. A process for sensitometrically testing a strip of photoconductive insulating material comprising the steps of:

charging said strip until the latter has acquired a predetermined surface charge;

exposing said charge strip to a light source through an absorptive wedge of continuously varying density throughout its length; and measuring the potential of the surface charge remaining along the length of said strip after exposure.

8. A process for sensitometrically testing a strip of photoconductive insulating material comprising the steps of:

moving said strip relative to a corona charging device at a predetermined rate until said strip has acquired a predetermined surface charge;

exposing said charged strip while moving the latter relative to an illuminated absorptive wedge of continuously varying density throughout its length; and measuring the potential of the surface charge remaining along the length of said strip after exposure.

9. A process according to claim 8 including the step of recording the potential of the surface charge remaining on said strip after exposure as a function of the exposure.

10. A process for sensitometrically testing a strip of photoconductive insulating material comprising the steps of:

moving said strip relative to a corona charging device at a predetermined rate for applying uniform incremental charges to said strip until the latter has acquired a predetermined surface charge;

exposing said charged strip while an absorptive wedge of varying density throughout its length is moved in synchronism with said strip relative to a light source; and measuring the potential of the surface charge remaining along the length of said strip after exposure.

11. A process according to claim 10 including the step of recording the increasing potential of the surface charge on said strip and the potential of the surface charge remaining on said strip after exposure as a function of the exposure.

References Cited

UNITED STATES PATENTS

| 2,781,705 | 2/1957 | Crumrine et al. | 95—1.7 |
| 3,321,307 | 5/1967 | Urbach | 324—32 X |

RUDOLPH V. ROLINEC, *Primary Examiner.*

CHARLES F. ROBERTS, *Assistant Examiner.*

U.S. Cl. X.R.

96—1; 97—1.7; 324—72